US012067873B2

(12) United States Patent
Peters

(10) Patent No.: US 12,067,873 B2
(45) Date of Patent: Aug. 20, 2024

(54) SYSTEM AND METHOD FOR CONTROLLING TRAFFIC

(71) Applicant: O.M.J.C. Signal, Inc., Waterloo, IA (US)

(72) Inventor: Gene Jeffrey Peters, Tripoli, IA (US)

(73) Assignee: O.M.J.C. Signal, Inc., Waterloo, IA (US)

( * ) Notice: Subject to any disclaimer, the term of this patent is extended or adjusted under 35 U.S.C. 154(b) by 0 days.

(21) Appl. No.: 17/855,580

(22) Filed: Jun. 30, 2022

(65) Prior Publication Data

US 2023/0005367 A1 Jan. 5, 2023

Related U.S. Application Data

(60) Provisional application No. 63/316,825, filed on Mar. 4, 2022, provisional application No. 63/217,628, filed on Jul. 1, 2021.

(51) Int. Cl.

| | |
|---|---|
| ***G08G 1/09*** | (2006.01) |
| ***E01F 9/692*** | (2016.01) |
| ***G08G 1/0955*** | (2006.01) |

(52) U.S. Cl.

CPC .......... *G08G 1/0955* (2013.01); *E01F 9/692* (2016.02)

(58) Field of Classification Search

CPC .............................. G08G 1/0955; E01F 9/692

See application file for complete search history.

(56) References Cited

U.S. PATENT DOCUMENTS

| | | | | | |
|---|---|---|---|---|---|
| 3,867,718 | A * | 2/1975 | Moe | G08G 1/0955 | 340/908 |
| 4,543,905 | A * | 10/1985 | McKenney | E01F 9/696 | 116/63 P |
| 4,616,225 | A * | 10/1986 | Woudenberg | G08G 1/0955 | 116/63 P |
| 4,992,788 | A * | 2/1991 | Arndt | E01F 9/662 | 340/908 |
| 5,294,138 | A * | 3/1994 | Yang | G08G 1/0955 | 116/63 P |
| 5,400,019 | A * | 3/1995 | Riscoe, Jr. | G08G 1/0955 | 116/63 P |
| 5,422,638 | A * | 6/1995 | Singer | G08G 1/095 | 116/63 P |
| 5,475,386 | A * | 12/1995 | Luoma | G08G 1/0955 | 116/63 P |
| 5,986,576 | A * | 11/1999 | Armstrong | F21V 21/06 | 116/63 P |
| 10,311,721 | B1 * | 6/2019 | Shibata | G08G 1/0955 | |
| 11,087,620 | B1 * | 8/2021 | Fanslow | G08G 1/07 | |
| 2002/0075169 | A1 * | 6/2002 | Brinkman | G08G 1/0955 | 340/908 |
| 2005/0270176 | A1 * | 12/2005 | Richardson | G08G 1/0955 | 340/908 |

(Continued)

*Primary Examiner* — Gary C Hoge

(74) *Attorney, Agent, or Firm* — Simmons Perrine Moyer Bergman PLC

(57) ABSTRACT

A portable traffic signal system with multiple signal heads where a substantially horizontal telescopic arm is used to support multiple signal heads, where each additional remote stage is initially inclined with respect to an adjacent less remote stage and multiple traffic signal control boxes are held to a trailer using a "J" hook and a hole in a trailer floor, in combination with a hand crank jack.

12 Claims, 14 Drawing Sheets

(56) References Cited

U.S. PATENT DOCUMENTS

| | | | | |
|---|---|---|---|---|
| 2008/0129543 | A1* | 6/2008 | Lee | G08G 1/0955 340/908 |
| 2008/0198038 | A1* | 8/2008 | Yingst | G08G 1/087 340/908 |
| 2012/0262304 | A1* | 10/2012 | Cripps | G08G 1/0955 340/908 |
| 2015/0042492 | A1* | 2/2015 | Heacock | G08G 1/0955 340/907 |
| 2017/0061791 | A1* | 3/2017 | Cherewka | G08G 1/04 |
| 2017/0154524 | A1* | 6/2017 | Beaulieu | E01F 9/30 |
| 2017/0263119 | A1* | 9/2017 | Campbell | G08G 1/08 |
| 2019/0019408 | A1* | 1/2019 | Beaulieu | G08G 1/07 |
| 2020/0240095 | A1* | 7/2020 | Rizzo | E01F 9/608 |
| 2021/0381179 | A1* | 12/2021 | Boyle | B60W 10/30 |

* cited by examiner

SYSTEM AND METHOD FOR CONTROLLING TRAFFIC

CROSS REFERENCE TO RELATED APPLICATIONS

This application claims the benefit of a provisional application filed on Jul. 1, 2021, and having Ser. No. 63/217,628 and on Mar. 4, 2022 and having Ser. No. 63/316,825, which are each hereby incorporated herein in their entirety by this reference.

FIELD OF THE INVENTION

The present invention generally relates to portable traffic signals and, even more particularly, relates to: improved portable traffic signals, systems with more than one portable traffic signal, new methods of transporting and deploying portable traffic signals, and new systems and methods for communication between multiple remote portions of multi-traffic signal systems.

BACKGROUND OF THE INVENTION

In the past, deployment of multiple traffic signal head systems has often been more laborious and time consuming than is optimal, because they are often needed at short notice after some unexpected event.

While some multi-traffic signal head systems which are made with wireless communication capabilities have been small enough to be hauled on a trailer(s) have provided significant utility in a wide variety of locations and applications have been used quite extensively in the past, they are often difficult and time consuming to deploy and configure on-site and often require multiple people or a large amount of time for a skilled technician.

Consequently, there exists a need for more economical methods and systems for deploying and using multiple portable traffic signals at a remote location.

SUMMARY OF THE INVENTION

It is an object of one aspect of the present invention to provide a portable traffic signal which has a compact transportable and flexible system which is quick and easy to deploy and operate.

It is a feature of one aspect of the present invention to utilize a pivoting signal head.

It is another feature to include a J shaped hook member disposed on the portable traffic signal unit which engages a portion of a trailer.

It is another feature of the present invention to provide a trailer configured to transport four portable traffic signal units.

It is still another feature of the invention to provide a sleek trailer bed which is free of any tie downs or other members which are raised above the plane of the top surface of the bed of the trailer, for receiving any ropes, straps or elongated flexible members used to stabilize a portable traffic signal unit with respect to the trailer bed.

It is an advantage of the present invention to provide for a system where four portable traffic signals can readily be stored on a small, short clearance height, narrow and easily towed trailer and be detached all without the need for ropes, straps, cables, chains, or other elongated flexible members.

It is another object of the present invention to eliminate all wires extending between the signal head and a base portion of a portable traffic signal, when a battery is located at the signal head, and in the alternative, to limit the number of such wires to just two when no battery is located at the signal head.

It is a feature to power all aspects of the traffic signal with a common power line plus a common ground line located in the signal head.

It is a feature of the present invention to eliminate all wireless communication between a master base unit and a remote base unit.

It is another feature of the present invention to eliminate all control wires extending from a remote base unit to its signal head.

It is an additional advantage of this embodiment of the present invention to provide a remote control for providing wireless signal to a plurality of signal heads, where the remote control contains a button which has a sole purpose to command, with a single push of the button, extending the time of the current phase of operation.

It is yet another feature of the present invention to provide a button which provides for direct switching, i.e. changing to another phase without the need for scrolling through an intermediate phase.

It is yet another object of the present invention to provide for rapid deployment of a horizontally and vertically compact portable multiple traffic signal head system in an efficient manner.

It is another feature of the present invention to include a three stage telescopic horizontal arm configured to cause a series of smaller internally nested arms to extend outwardly from a larger volume proximal arm at an angle upwardly inclined with respect to the proximal arm.

Accordingly, the present invention is a portable system for rapidly providing a portable traffic signal unit at a remote location comprising:

- a trailer deck 500 having a trailer deck void 510 and a trailer deck engagement portion 512;
- a portable traffic signal unit having a base portion 300 with a bottom side with a base portion protuberance extending downwardly therefrom;
- a jack 310 coupled to said base portion 300, said jack configured to lift a portion of the portable traffic signal unit upwardly from the trailer deck; and
- said base portion protuberance, said trailer deck engagement portion, and said jack being configured in combination so that a manipulation of said jack causes said base portion protuberance to contact said trailer deck engagement portion and thereby increase a level of connection between said portable traffic signal unit and said trailer deck.

A system comprising a portable traffic signal unit comprising:

- a wheeled vehicle;
- a first mast arm coupled to said wheeled vehicle;
- a telescoping second mast arm with a distal end and a proximal end, the proximal end being coupled to said first mast arm;
- a signal head disposed at said distal end;
- said telescoping second mast arm having a first stage arm and a second stage arm;
- said second stage arm with a proximal portion thereof being configured to move in and out of a first longitudinal void in said first stage arm;
- said first longitudinal void having a first longitudinal axis;
- said second stage arm having a second longitudinal axis; and internal structure within said first longitudinal void sized and configured to cause said second longitudinal axis to be inclined with respect to said first longitudinal axis when a removal process of said second stage arm from said first longitudinal void is commenced.

A system comprising a method of rapidly deploying a plurality of traffic signal heads at a remote location comprising the steps of:

moving a trailer to said remote location; and causing a pivot joint to move when a first mast arm is moved, which causes a tie rod to move and a bell crank to move, thereby causing a plurality of traffic signal heads to simultaneously telescope outwardly when said first mast arm is raised.

DETAILED DESCRIPTION

Figure 1:
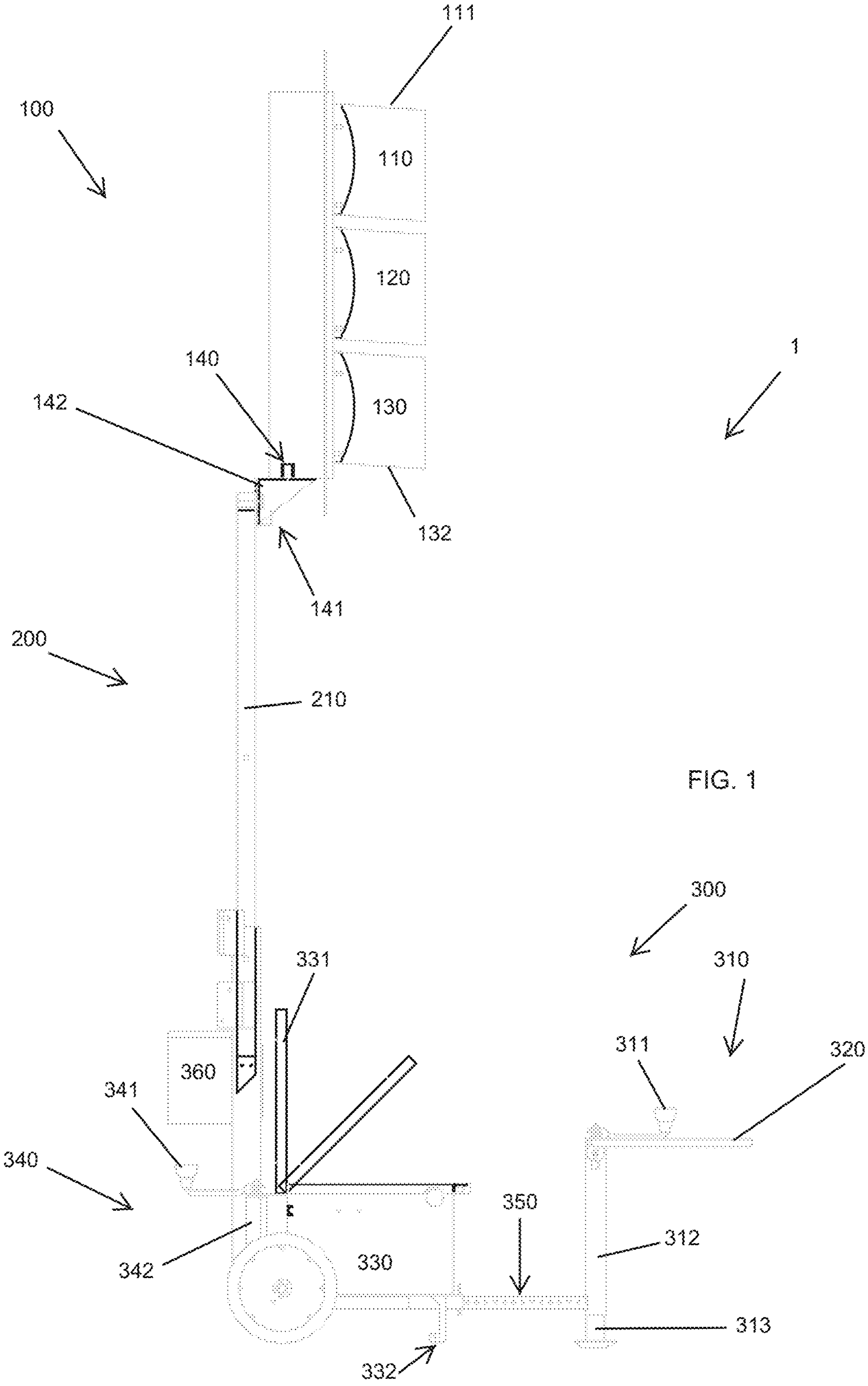
FIG. 1 is an elevation view of a master portable traffic signal unit of the present invention, in a deployed ready for use configuration.

Now referring to the drawings wherein like numerals refer to like matter throughout and more particularly referring to FIG. 1, there is shown a master portable traffic signal unit, generally designated 1 with a master control box 360 thereon. A secondary unit which is controlled, in part, by a master portable traffic signal unit would be nearly identical except without the master control box 360 and its control hardware therein, which includes a human machine interface for inputting variable operational parameters, which are then communicated via microwave communication equipment therein to remote non-master portable traffic signal units which are deployed, typically within 100 yards of each other at a site location.

Signal head 100 includes a red light assembly 110, yellow light assembly 120, and green light assembly 130. Also shown is red light assembly top portions 111.

Vertical mast 200 with vertical mast upper portion 210 is shown disposed between the base portion 300 and signal head 100. The signal head 100 is configured to rotate from a deployed ready-to-use orientation of FIG. 1 to a transport configuration of FIG. 2. Rotational interface 142 provides the ability for signal head 100 to rotate in plane parallel to a front plane of signal head 100, to a back plane of base portion enclosure 330 and a front plane of vertical mast 200. Rotational interface 142 includes a rotational interface to signal head port 140 which can permit wires (ideally a maximum of two) to extend from the base portion enclosure 330 to the signal head 100. Rotational interface to vertical mast latch mechanism 141 can be a spring loaded pin to selectively engage the rotational interface 142 with the vertical mast 200.

Figure 5:
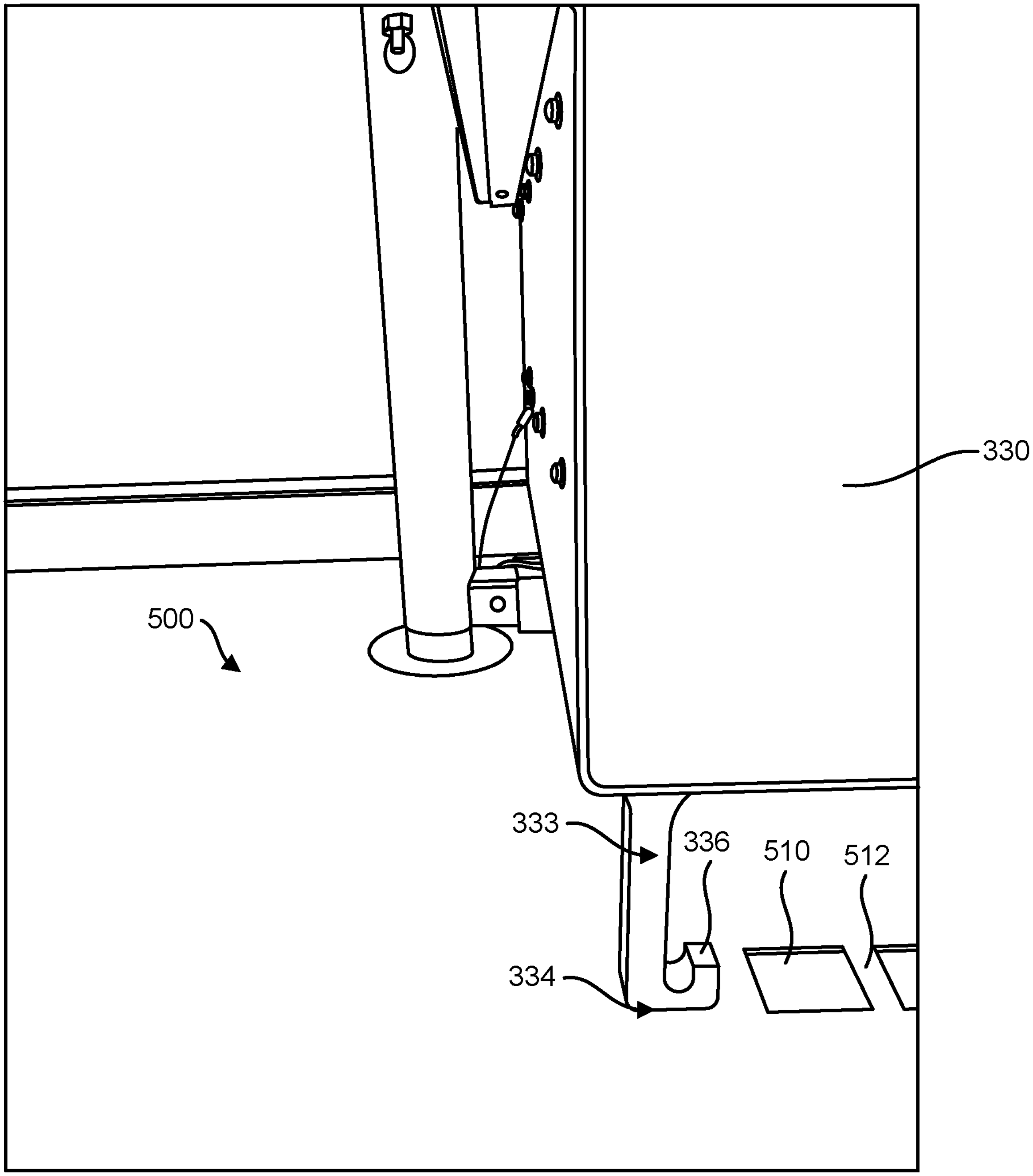
FIG. 5 is a perspective view of a portable traffic signal unit of the present invention disposed in temporary orientation on a trailer of the present invention.

Base portion 300 includes front hand cranked jack 310, which is shown displaced from the base portion enclosure 330 by adjustable length outrigger bar 350, with front hand cranked jack handle 311, front hand cranked jack outer tube 312, and front hand cranked jack smaller tube 313. Front hand cranked jack 310 can be used to secure the base portion enclosure 330 to a portion of a trailer deck by biasing base portion "J" shaped leg 332 with a trailer deck engagement portion 512 (FIG. 5).

Rear hand cranked jack 340 is shown disposed adjacent to the vertical mast 200 and base portion enclosure 330 and it includes a rear hand cranked jack handle 341 and rear hand cranked jack outer tube 342. This can be displaced to form an outrigger and used along with other similar jacks to level and stabilize the master portable traffic signal unit 1 when it is fully deployed for operation, see FIG. 8.

Handle bars 320 are shown in a deployed arrangement to facilitate movement of the master portable traffic signal unit 1. Optional solar panel 331 may be disposed on or forming a lid of base portion enclosure 330. FIG. 1 is showing the optional solar panel/lid 331 being opened and closed.

Figure 2:
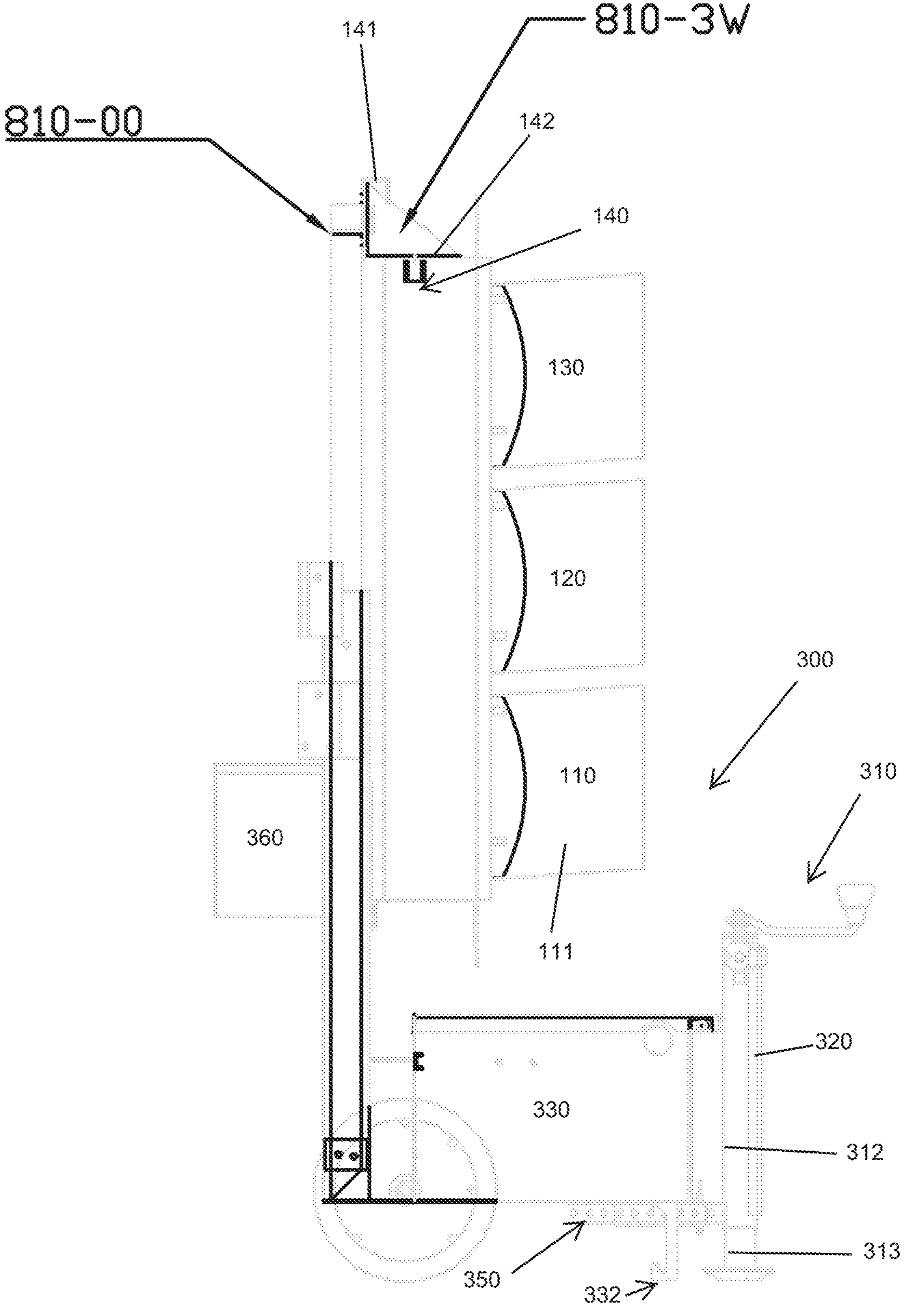
FIG. 2 is an elevation view of the master portable traffic signal unit of FIG. 1 in a transport configuration.

Now referring to FIG. 2, there is shown a view of the master portable traffic signal unit 1 in a transport configuration after having: 1) rotated signal head 100 downward, 2) slid adjustable length outrigger bar 350 under base portion enclosure 330, and 3) having folded handle bars 320 down from a horizontal orientation to vertical. It can be seen that the red light assembly top portions 111 are now located at the very bottom of the signal head 100.

Figure 3:
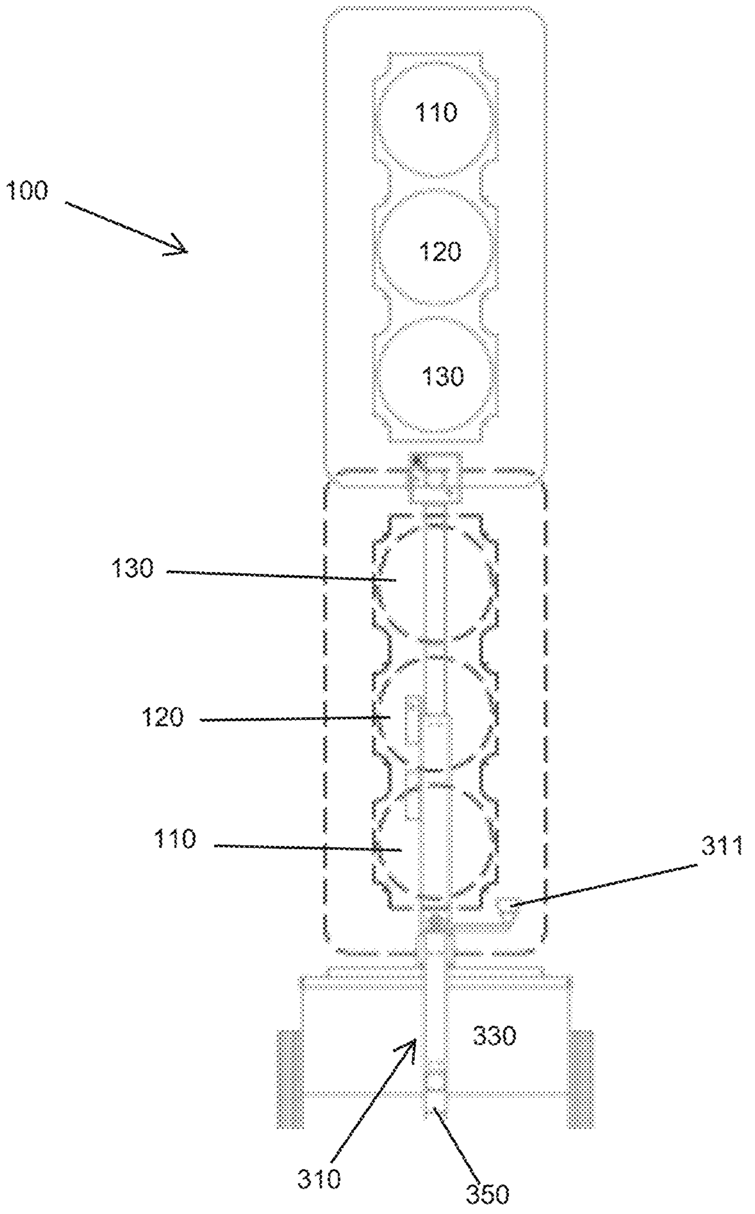
FIG. 3 is a frontal view of the master portable traffic signal unit of FIG. 1 with the orientation of the signal head 100 for FIG. 2 shown in dashed lines.

Now referring to FIG. 3, there is shown a front view of the master portable traffic signal unit 1 of FIG. 1, which also shows with dashed lines the phantom orientation of signal head 100 from FIG. 2.

Figure 4:
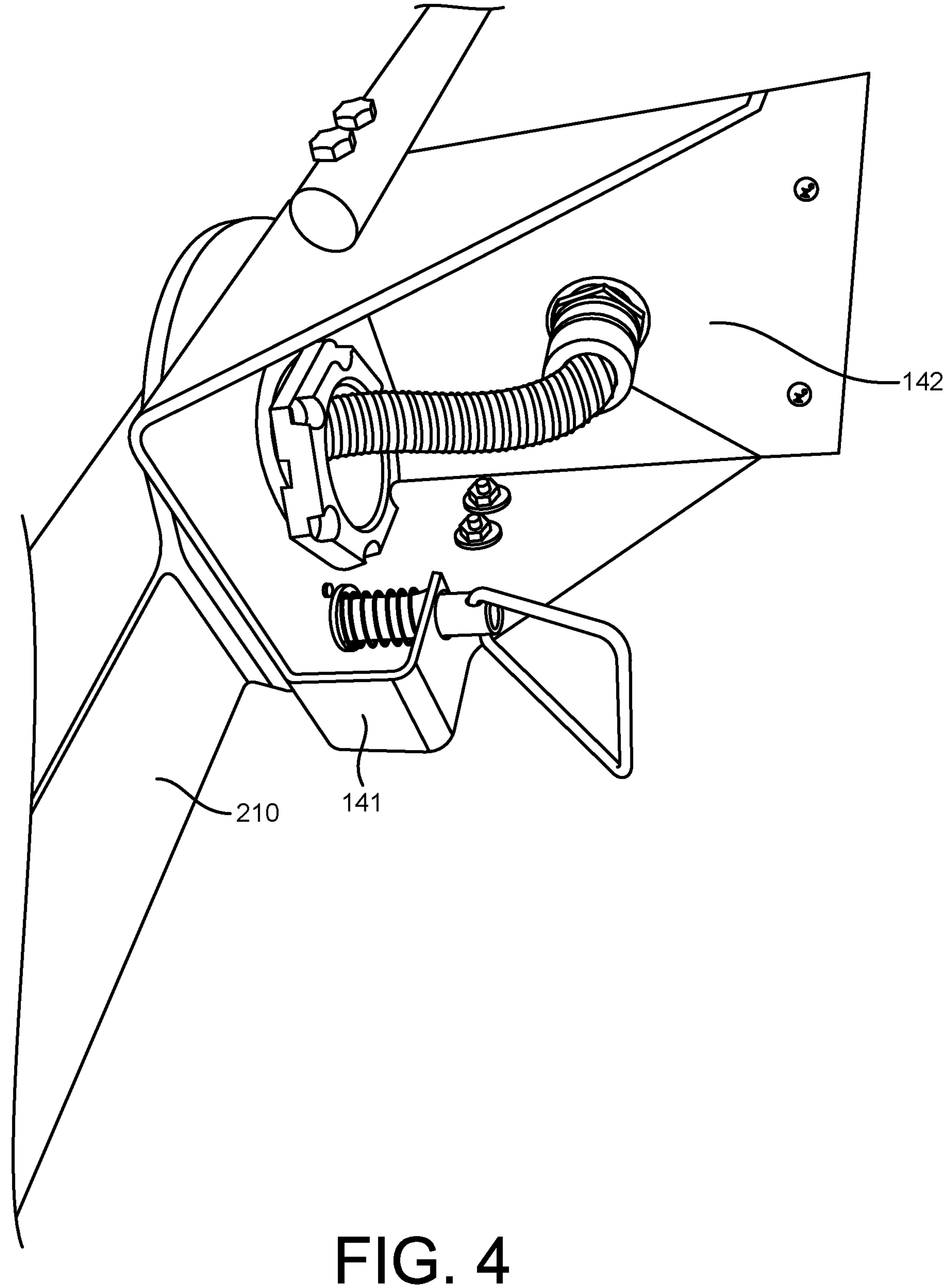
FIG. 4 is view of a signal head rotation portion of FIG. 1.

Now referring to FIG. 4, there is shown a perspective view of a portion of the master portable traffic signal unit 1 which includes rotational interface 142 with rotational interface to vertical mast latch mechanism 141 (shown with spring loaded pin and handle pull). A flexible conduit/covering for protecting internal wires during rotation of the rotational interface 142 with respect to vertical mast upper portion 210.

Figure 6:
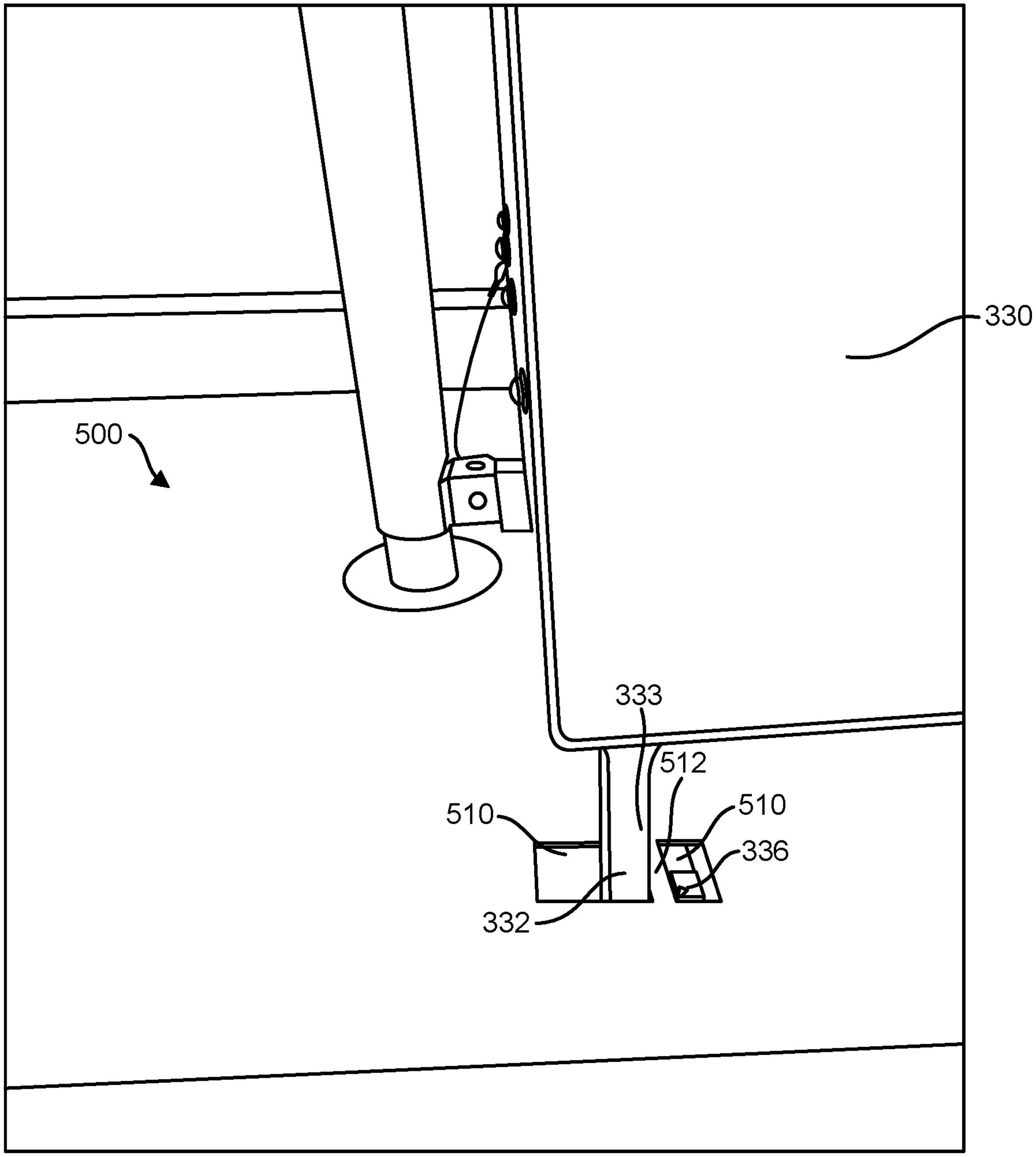
FIG. 6 is another perspective view of the portable traffic signal unit of FIG. 5 now disposed in a secured configuration.
Figure 7:
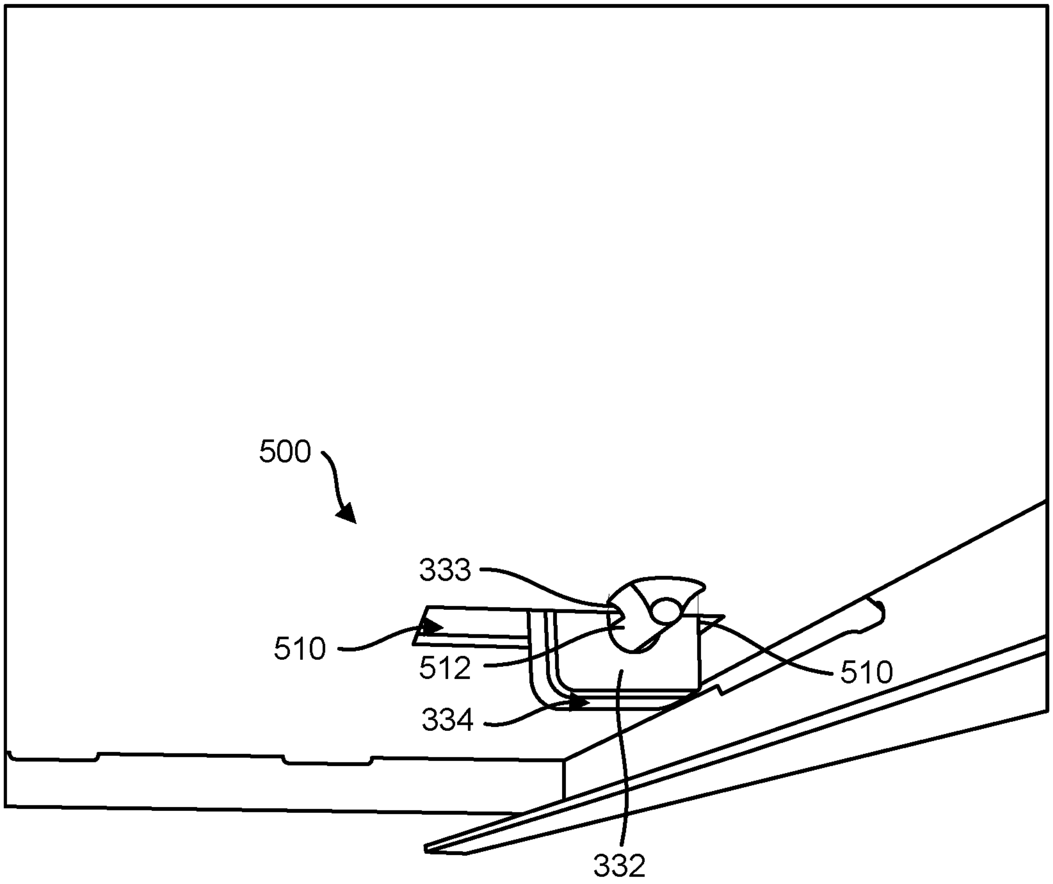
FIG. 7 is a perspective view of the portable traffic signal unit in the configuration of FIG. 6 but from beneath a deck of the trailer of FIGS. 5 and 6.

Now referring to FIGS. 5-7, there are shown intermediate stages of a method of the present invention for securing the master portable traffic signal unit 1 into a trailer. FIG. 5 shows the master portable traffic signal unit 1, disposed on the deck 500 of a trailer having a trailer deck void 510 therein configured to allow the leg flat bottom side 334 of base portion "J" shaped leg 332 to pass therethrough and extend below a bottom portion of the trailer deck 500. Also shown is trailer deck engagement portion 512 which can be a rod welded to the underside of the trailer bed, a small portion of the trailer deck 500 located between two holes in the trailer deck 500, or other suitable structures. From the position shown in FIG. 5, the master portable traffic signal unit 1 is moved forward on the trailer deck 500 and the leg flat bottom side 334 of base portion "J" shaped leg 332 moves over and finally into the trailer deck void 510. The master portable traffic signal unit 1 is moved further forward until leg back side 333 engages trailer deck engagement portion 512. Now the master portable traffic signal unit 1 is secured to the trailer when the front hand cranked jack handle 311 is turned so as to extend the length of the exposed front hand cranked jack smaller tube 313 from the front hand cranked jack outer tube 312. Eventually, cranking will result in lifting of the master portable traffic signal unit 1 and raising the base portion "J" shaped leg 332 until it engages with trailer deck engagement portion 512.

Now referring to FIG. 6 which shows the secured orientation of base portion "J" shaped leg 332, and leg back side 333 with respect to trailer deck engagement portion 512. The top distal portion 336 of the base portion "J" shaped leg 332 is now visible through the trailer deck void 510.

Now referring to FIG. 7, there is shown a view of the master portable traffic signal unit 1 as located in the same configuration as FIG. 6 but as seen from the underside of the trailer deck 500. The leg back side 333 is adjacent to one side of trailer deck engagement portion 512 and the distal portion of the base portion "J" shaped leg 332 is adjacent to an opposite side of the trailer deck engagement portion 512 from leg back side 333.

Applying a biasing force with front hand cranked jack 310 results in the ability to retain master portable traffic signal unit 1 to the trailer without the need for ropes, straps, chains, bolts. The front hand cranked jack 310 provides an extra transportation security utility beyond the normal operational stability utility to help stabilize the master portable traffic signal unit 1 when it is deployed for operation.

Figure 8:
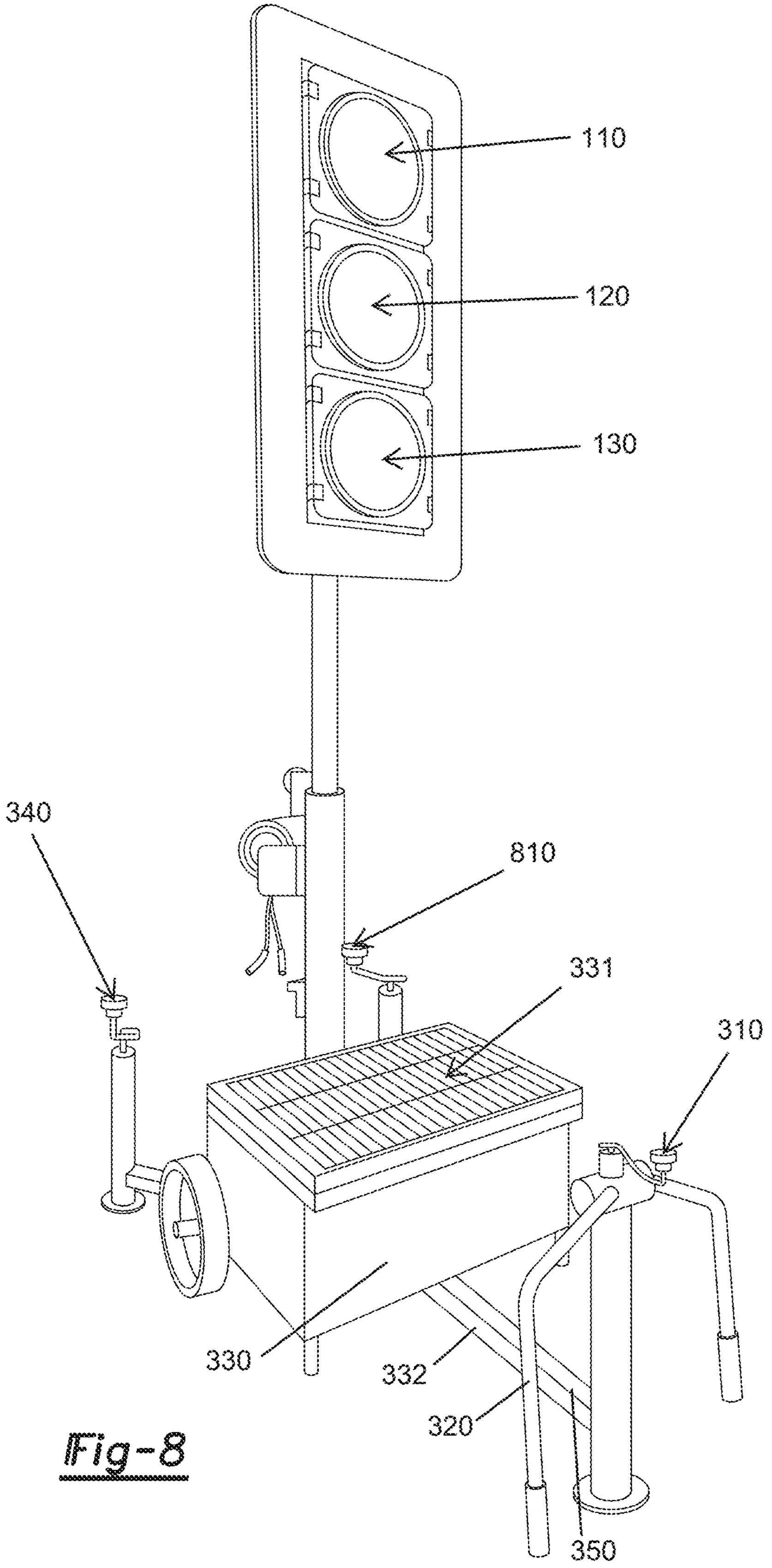
FIG. 8 is a perspective view of a portable traffic signal unit in a partially deployed configuration.

Now referring to FIG. 8, there is shown the non-master portable traffic signal unit 1 (note the master control box 360 is not present). Front hand cranked jack 310 is deployed an adjustable and extended distance from base portion enclosure 330 utilizing adjustable length outrigger bar 350 to form an outrigger stabilizer. Also shown is an outrigger hand crank jack 810, and rear hand cranked jack 340 which are extended away from base portion enclosure 330 to perform as outriggers. In this FIG., optional solar panel 331 is shown in a horizontal or flat orientation.

Figure 9:
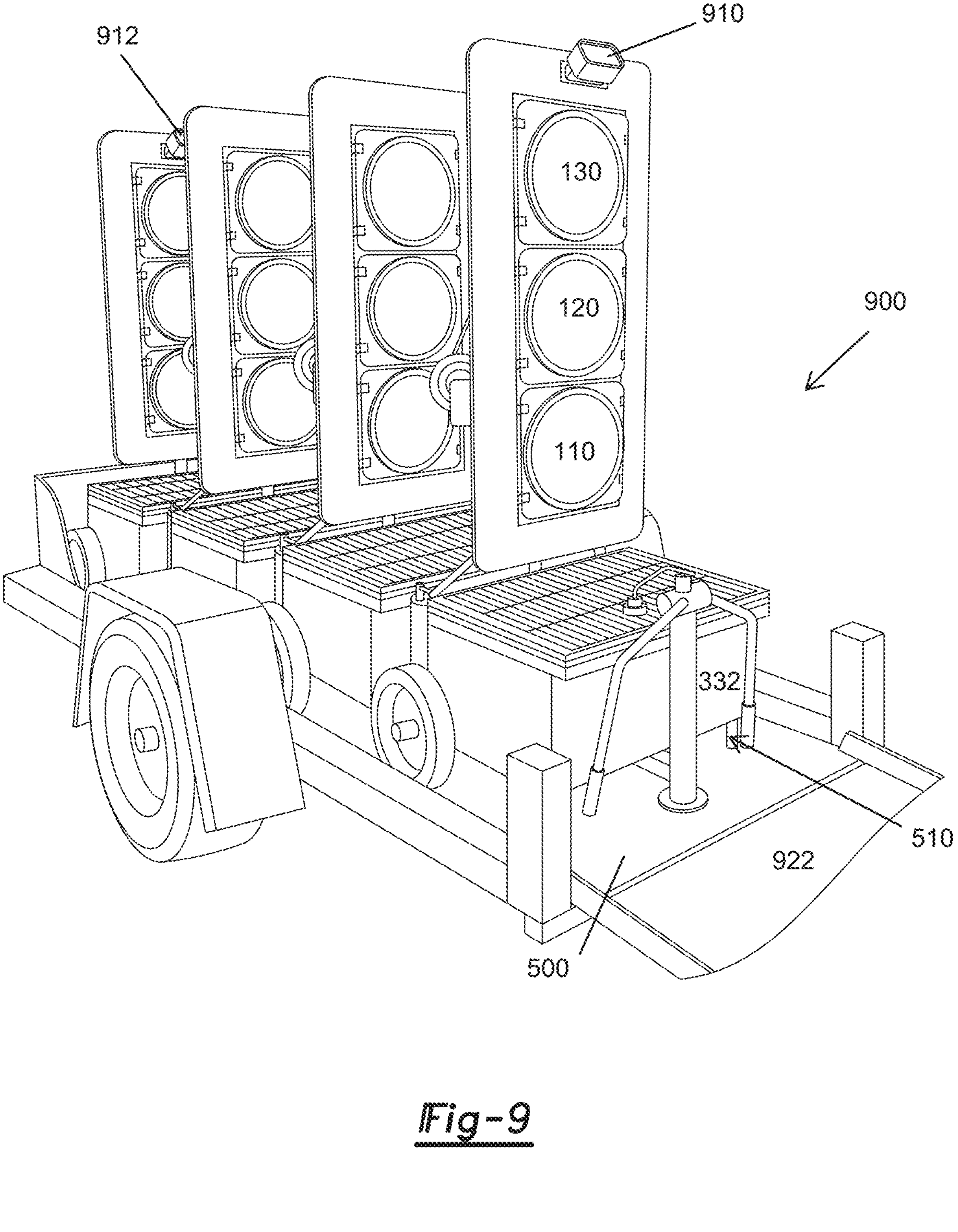
FIG. 9 is a perspective view of the present invention including the trailer, four portable traffic signal units secured thereon, all in a transport configuration, except with the ramp down.

Now referring to FIG. 9, there is shown an embodiment of the present invention which includes: four portable traffic signal units, each with their respective signal head 100 rotated to a transport orientation with green light assembly 130 at the top of the array. Two of the units each have one of the microwave (MW) detectors 910 and 912. These MW detectors provide information about presence of vehicles which is used to affect a change of phase of operation of the group of units in a coordinated manner.

Figure 10:
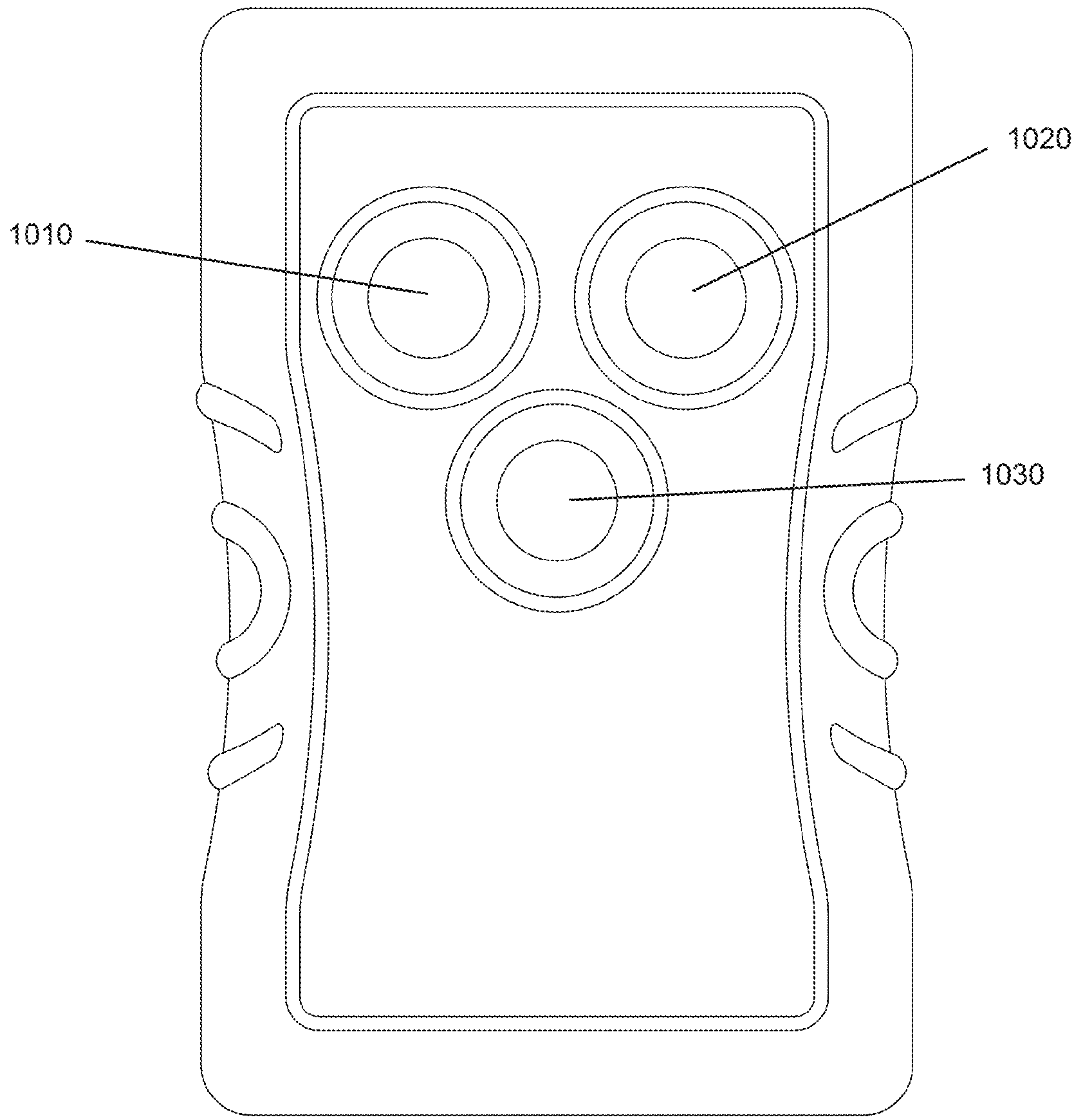
FIG. 10 is a view of a face portion of a remote control of the present invention showing a triangular area of just three buttons.

Now referring to FIG. 10, there is shown a face of a remote control with three buttons thereon. These buttons perform as follows: Next 1010: Cycles running phase to a shortened green and red interval to run next phase. Pause/Ext 1020: Depending upon the software utilized for this function engaging this button either pauses the green or red interval until you press the next button or it adds a predetermined extra amount of time to the current phase for each time the button in pressed. The amount may be fifteen seconds or any appropriate set amount of time. E-Stop 1030: Cycles system quickly to solid all red.

Figure 11:
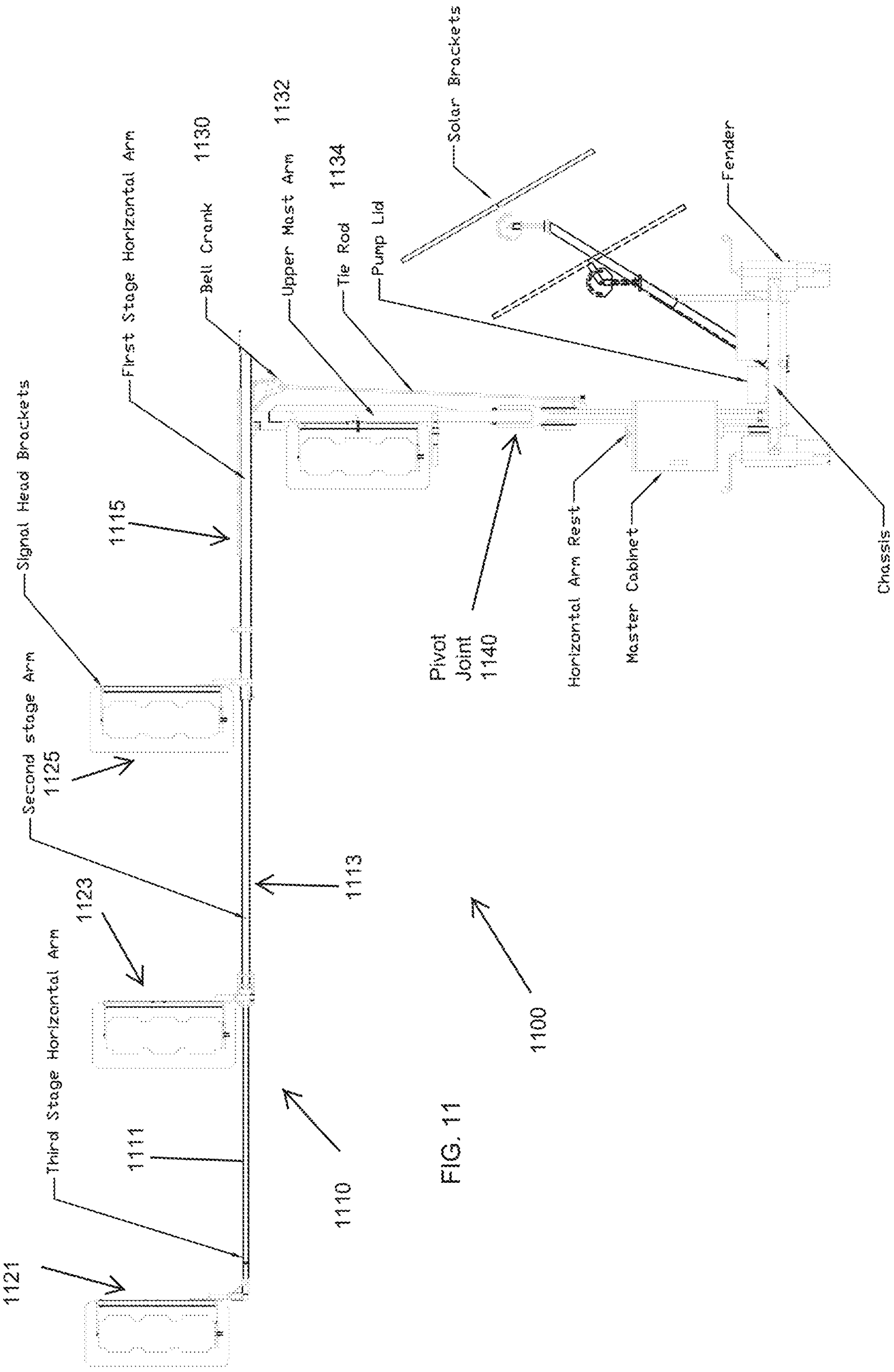
FIG. 11 is an end view of a trailer mounted portable traffic signal of the present invention with three stage extendable horizontal arm and retractable solar panel.

Now referring to FIG. 11, there is shown an embodiment of the present invention generally designated with a three stage horizontal arm 1110 with third stage horizontal arm 1111, second stage horizontal arm 1113, and first stage horizontal arm 115 with three traffic signals 1121, 1123, and 1125 respectively disposed thereon. Also shown is bell crank 1130, upper mast arm 1132, tie rod 1134, pivot joint 1140.

Figure 12:
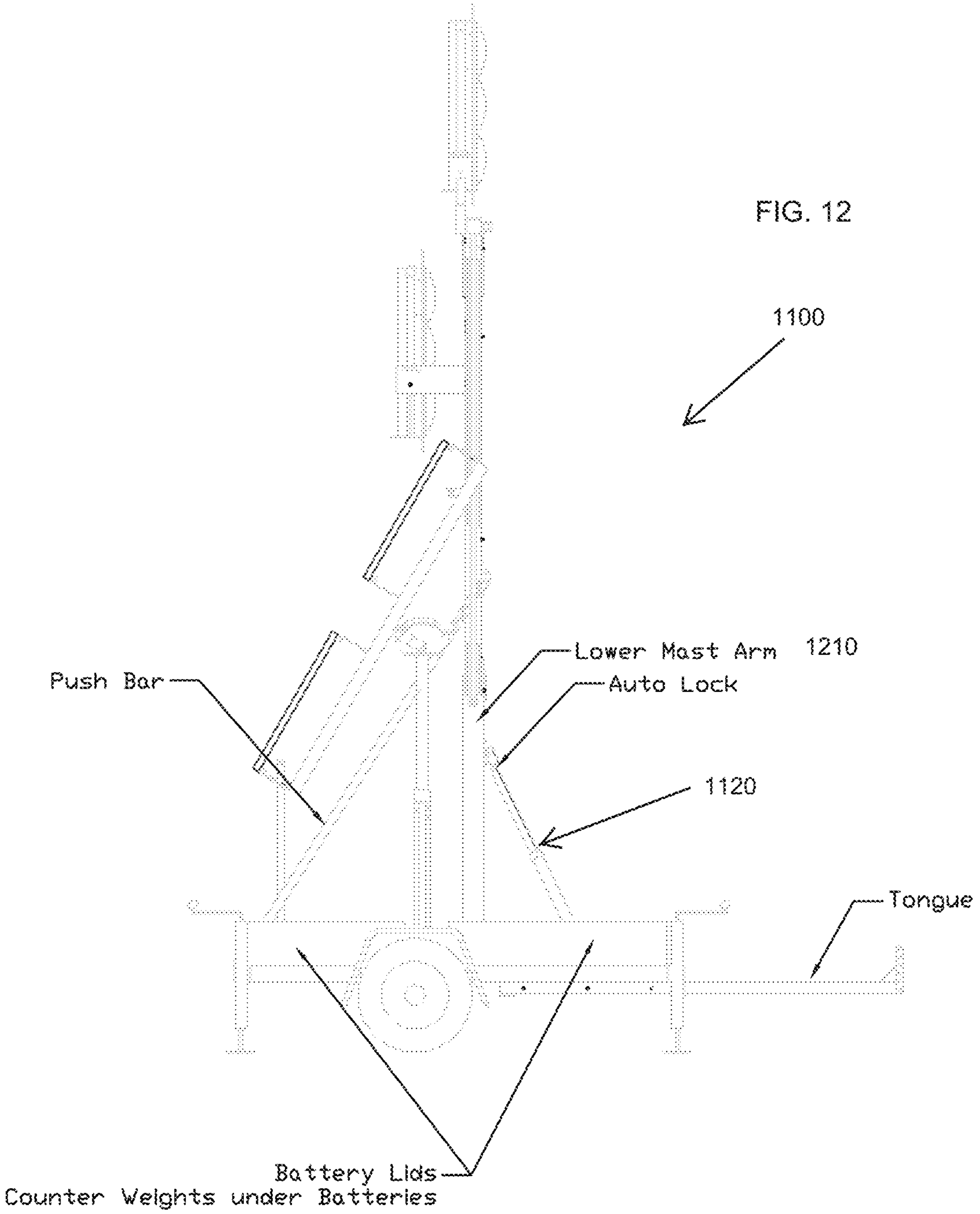
FIG. 12 is a side view of the portable traffic signal of FIG. 11.

Now referring to FIG. 12, there is shown a side view of the system 1100 of FIG. 11, which includes lower mast arm 1210 and auto lock 1120.

Figure 13:
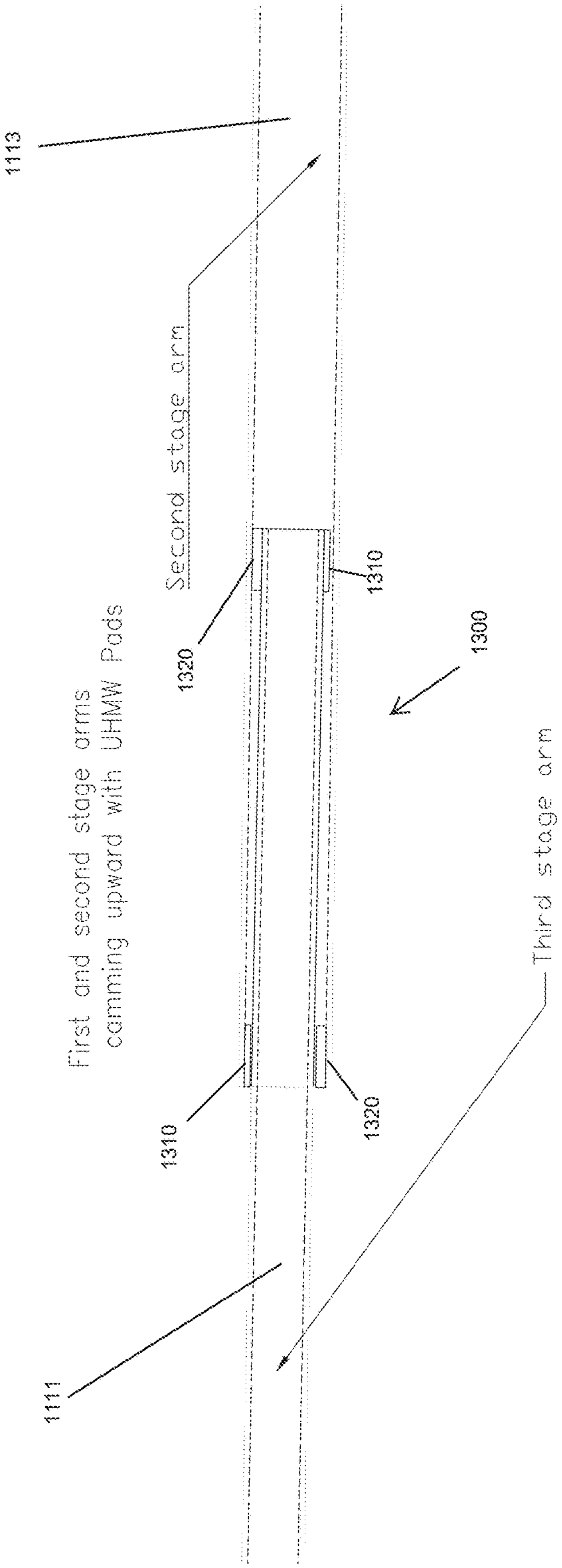
FIG. 13 is a cross-sectional view of portions of the second stage arm and the third stage arm and the portions where they are concentric.

Now referring to FIG. 13, there is shown third stage arm 1111 with a proximal portion thereof disposed inside of a distal end of second stage arm 1113. A thick Ultra High Molecular Weight Polyethylene (UHMW) pad 1320 is shown disposed on a top exterior side of the proximal end of third stage arm 1111 and with a thin UHMW 1310 pad being disposed on an opposing bottom exterior side. At the distal end of second stage arm 1113 there is shown a thin UHMW 1310 pad disposed on an upper interior side and an opposing thick UHMW pad 1320 disposed the lower interior side. The use of differing thickness pads at the ends of the third and second stage would result in the distal end of the third stage arm being vertically higher than the proximal end if no traffic signal were placed at the distal end of the third stage arm 1111. However, when a traffic signal is placed on its distal end, its weight tends to cause the third stage arm 1111 to deflect downward making the distal end be lower than if no traffic signal were present. If the difference in thickness between UHMW pad 1320 and 1310 is made larger if the material used for third stage arm 1111 is more prone to bending downward, the problems associated with a sagging distal traffic light can be reduced.

Figure 14:
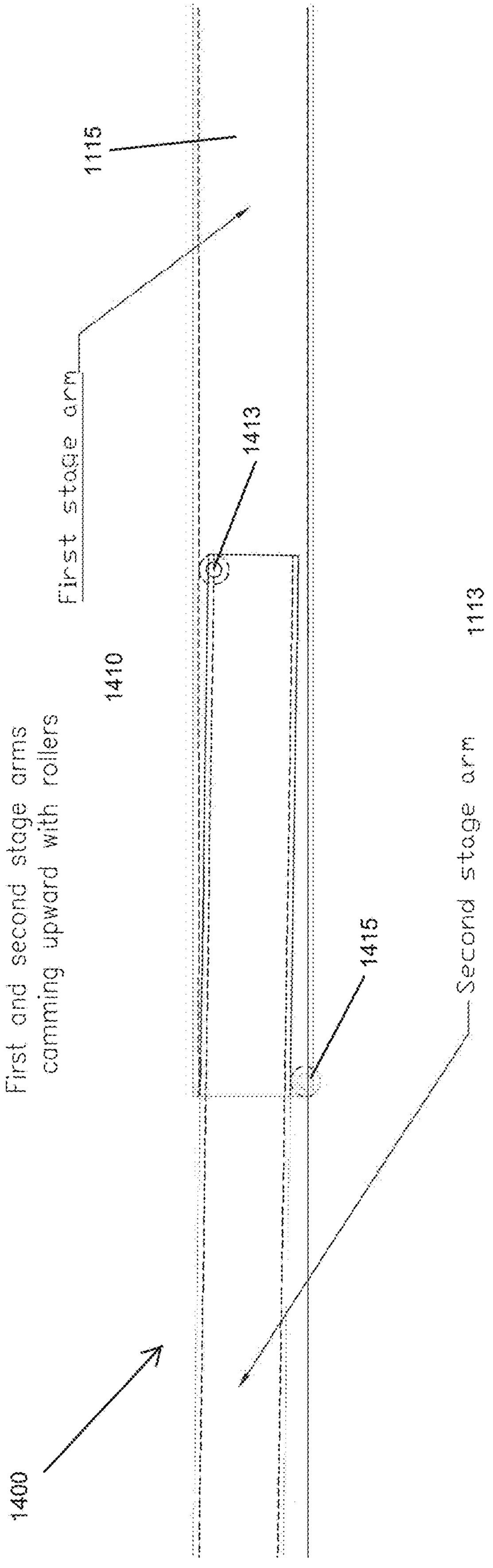
FIG. 14 is a cross-sectional view of portions of the first stage arm and the second stage arm and the portion where they are concentric.

Now referring to FIG. 14, there is shown a cross-section view of the first and second stage arms generally designated 1400, which is a similar situation except for use of a single roller is used in place of the thicker UHMW pads 1320 and the thin UHMW pads are eliminated. There is shown an upper second stage arm external roller 1413, and a lower first stage arm internal roller 1415.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A portable traffic signal unit comprising:
- a wheeled vehicle;
- a first mast arm coupled to said wheeled vehicle;
- a telescoping second mast arm with a distal end and a proximal end, the proximal end being coupled to said first mast arm;
- a signal head disposed at said distal end;
- said telescoping second mast arm having a first stage arm and a second stage arm;
- said second stage arm with a proximal portion thereof being configured to move in and out of a first longitudinal void in said first stage arm;
- said first longitudinal void having a first longitudinal axis;

said second stage arm having a second longitudinal axis; and internal structure within said first longitudinal void sized and configured to cause said second longitudinal axis to be inclined with respect to said first longitudinal axis when a removal process of said second stage arm from said first longitudinal void is commenced.

2. The portable traffic signal unit of claim 1 wherein said internal structure further comprises a first stage distal structure disposed inside of and at a distal end of said first longitudinal void.

3. The portable traffic signal of claim 2 wherein said first stage distal structure is disposed at a bottom portion of the distal end of said first longitudinal void.

4. The portable traffic signal of claim 2 wherein said internal structure further comprises a second stage proximal structure disposed outside of and at a proximal end of said second stage arm.

5. The portable traffic signal of claim 4 wherein said first stage distal structure is disposed at a bottom portion of the distal end of said first longitudinal void.

6. The portable traffic signal of claim 5 wherein said second stage proximal structure is disposed at a top portion of said proximal end of said second stage arm.

7. The portable traffic signal of claim 1 wherein said internal structure further comprises a second stage proximal structure disposed outside of and at a proximal end of said second stage arm.

8. The portable traffic signal of claim 7 wherein said second stage proximal structure is disposed at a top portion of said proximal end of said second stage arm.

9. The portable traffic signal of claim 1 wherein said internal structure comprises a pad made of Ultra High Molecular Weight Polyethylene.

10. The portable traffic signal of claim 1 wherein said internal structure comprises a roller attached to an object and said roller configured with a wheel configured to rotate with respect to said object.

11. The portable traffic signal of claim 1 wherein said first mast arm has an upper mast arm portion and a lower mast arm portion with a pivot joint therebetween and a tie rod extending across the pivot joint and configured so as to cause relative movement between said first stage arm and said second stage arm when movement occurs between said lower mast arm portion and said upper mast arm portion.

12. The portable traffic signal of claim 11 further comprising a bell crank pivotally coupled to said upper mast arm so as to cause bi-directional relative motion of said first stage arm and said second stage arm when the pivot joint is utilized.

* * * * *